US009510435B2

(12) United States Patent
Hebert et al.

(10) Patent No.: US 9,510,435 B2
(45) Date of Patent: Nov. 29, 2016

(54) GAS CONTROL SYSTEM FOR A PLASMA ARC TORCH

(71) Applicant: Thermal Dynamics Corporation, West Lebanon, NH (US)

(72) Inventors: Brandon Hebert, Williamstown, VT (US); Christopher J. Conway, Wilmont, NH (US)

(73) Assignee: Victor Equipment Company, Denton, TX (US)

( * ) Notice: Subject to any disclaimer, the term of this patent is extended or adjusted under 35 U.S.C. 154(b) by 695 days.

(21) Appl. No.: 13/924,919

(22) Filed: Jun. 24, 2013

(65) Prior Publication Data
US 2014/0374392 A1    Dec. 25, 2014

(51) Int. Cl.
B23K 9/00   (2006.01)
H05H 1/34   (2006.01)
B23K 10/00  (2006.01)

(52) U.S. Cl.
CPC ............... H05H 1/34 (2013.01); B23K 10/00 (2013.01); H05H 2001/3421 (2013.01); H05H 2001/3426 (2013.01)

(58) Field of Classification Search
CPC ................. B23K 10/00; H05H 1/34; H05H 2001/3421; H05H 2001/3426
USPC ............. 219/74, 75, 121.11, 121.36, 121.48, 219/121.49, 121.5, 121.51, 121.52, 121.55
See application file for complete search history.

(56) References Cited

U.S. PATENT DOCUMENTS

| | | | |
|---|---|---|---|
| 3,004,189 A | 10/1961 | Giannini | |
| 3,489,876 A | 1/1970 | Haase | |
| 5,166,494 A * | 11/1992 | Luo et al. | B23K 10/00 219/121.51 |
| 5,414,237 A | 5/1995 | Carkhuff | |
| 5,916,464 A * | 6/1999 | Geiger | B23K 9/1336 219/130.4 |
| 6,333,481 B2 | 12/2001 | Augeraud et al. | |
| 6,335,505 B2 | 1/2002 | Billerot | |
| 6,960,737 B2 * | 11/2005 | Tatham | H05H 1/34 219/121.5 |
| 8,283,594 B2 | 10/2012 | Griffin | |
| 9,000,322 B2 * | 4/2015 | Barnett et al. | H05H 1/34 219/121.51 |
| 2007/0045241 A1 | 3/2007 | Schneider | |

OTHER PUBLICATIONS

International Search Report and Written Opinion for PCT/US2014/043828 dated Sep. 22, 2014.

* cited by examiner

*Primary Examiner* — Dana Ross
*Assistant Examiner* — Joseph Iskra

(57) ABSTRACT

A plasma arc torch is provided that includes a torch head, a pre-flow gas conduit for directing a pre-flow gas through the plasma arc torch, at least one plasma gas conduit for directing a plasma gas through the plasma arc torch, and a gas control device. The pre-flow gas conduit and the plasma gas conduit extend into a proximal end portion of the torch head. The gas control device is disposed proximate the torch head and extends between a distal end portion of the pre-flow gas conduit and a distal end portion of the plasma gas conduit. The gas control device is operatively connected to each of the pre-flow gas conduit and the plasma gas conduit. The gas control device selectively allows one of the pilot gas and the plasma gas to flow through the plasma arc torch.

32 Claims, 7 Drawing Sheets

GAS CONTROL SYSTEM FOR A PLASMA ARC TORCH

FIELD

The present disclosure relates to plasma arc torches and more specifically to gas control systems for the plasma arc torches.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

In operation, a pilot gas, such as air, is first delivered to the plasma chamber in the plasma arc torch to initiate the pilot arc. When the pilot arc is initiated, a cutting gas, such as oxygen, is delivered to the plasma chamber for the cutting process. In some plasma arc torches, the pilot gas and the cutting gas are selectively delivered to the plasma chamber through a common gas line and are controlled by solenoids. The solenoids are switched on and off to allow only one of the pilot gas and the cutting gas to flow through the solenoids to the common gas line and then to the plasma chamber.

SUMMARY

In one form of the present disclosure, a plasma arc torch includes a torch head, a pre-flow gas conduit, at least one plasma gas conduit, and a gas control device. The torch head has a proximal end portion and a distal end portion. The pre-flow gas conduit for directing a pre-flow gas through the plasma arc torch extends into the proximal end portion of the torch head and defines a distal end portion. The plasma gas conduit for directing a plasma gas through the plasma arc torch extends into the proximal end portion of the torch head and defines a distal end portion. The gas control device is disposed proximate the torch head and extends between the distal end portion of the pre-flow gas conduit and the distal end portion of the plasma gas conduit. The gas control device is operatively connected to each of the pre-flow gas conduit and the plasma gas conduit. The gas control device selectively allows one of the pilot gas and the plasma gas to flow through the plasma arc torch.

In another form of the present disclosure, a plasma arc torch includes a torch head, a pre-flow gas conduit, at least one plasma gas conduit, a pre-flow solenoid, a plasma solenoid, and a gas control device. The torch head has a proximal end portion and a distal end portion. The pre-flow gas conduit directs a pilot gas through the plasma arc torch and extends into the proximal end portion of the torch head. The pre-flow gas conduit defines a proximal end portion and a distal end portion. The plasma gas conduit directs a plasma gas through the plasma arc torch and extends into the proximal end portion of the torch head. The plasma gas conduit defines a proximal end portion and distal end portion. The pre-flow solenoid controls a flow of the pre-flow gas from a pre-flow gas source to the pre-flow gas conduit and is operatively connected to the proximal end portion of the pre-flow gas conduit. The plasma solenoid controls a flow of the plasma gas from a plasma gas source to the plasma gas conduit and is operatively connected to the proximal end portion of the plasma gas conduit. The gas control device is disposed within the torch head and extends between the distal end portion of the pre-flow gas conduit and the distal end portion of the plasma gas conduit. The gas control device is operatively connected to each of the pre-flow gas conduit and the plasma gas conduit. The gas control device selectively allows one of the pilot gas and the plasma gas to flow through the plasma arc torch.

In still another form, a plasma arc torch includes a torch head and a supplemental gas control device disposed within the torch head and extending between at least two gas conduits. Each gas conduit has its own gas control device disposed proximally from the supplemental gas control device. The supplemental gas control device is operatively connected to each of gas conduits to selectively allow one gas from one gas conduit to flow through the plasma arc torch.

In still another form, a method of controlling a gas flow through a plasma arc torch includes: directing a flow of pre-flow gas into a torch head of the plasma arc torch, the flow of pre-flow gas being proximally controlled; directing a flow of plasma gas into the torch head of the plasma arc torch, the flow of plasma gas being proximally controlled; and further controlling the flow of pre-flow gas and plasma gas through the plasma arc torch by distally blocking one of the pre-flow gas and plasma gas.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
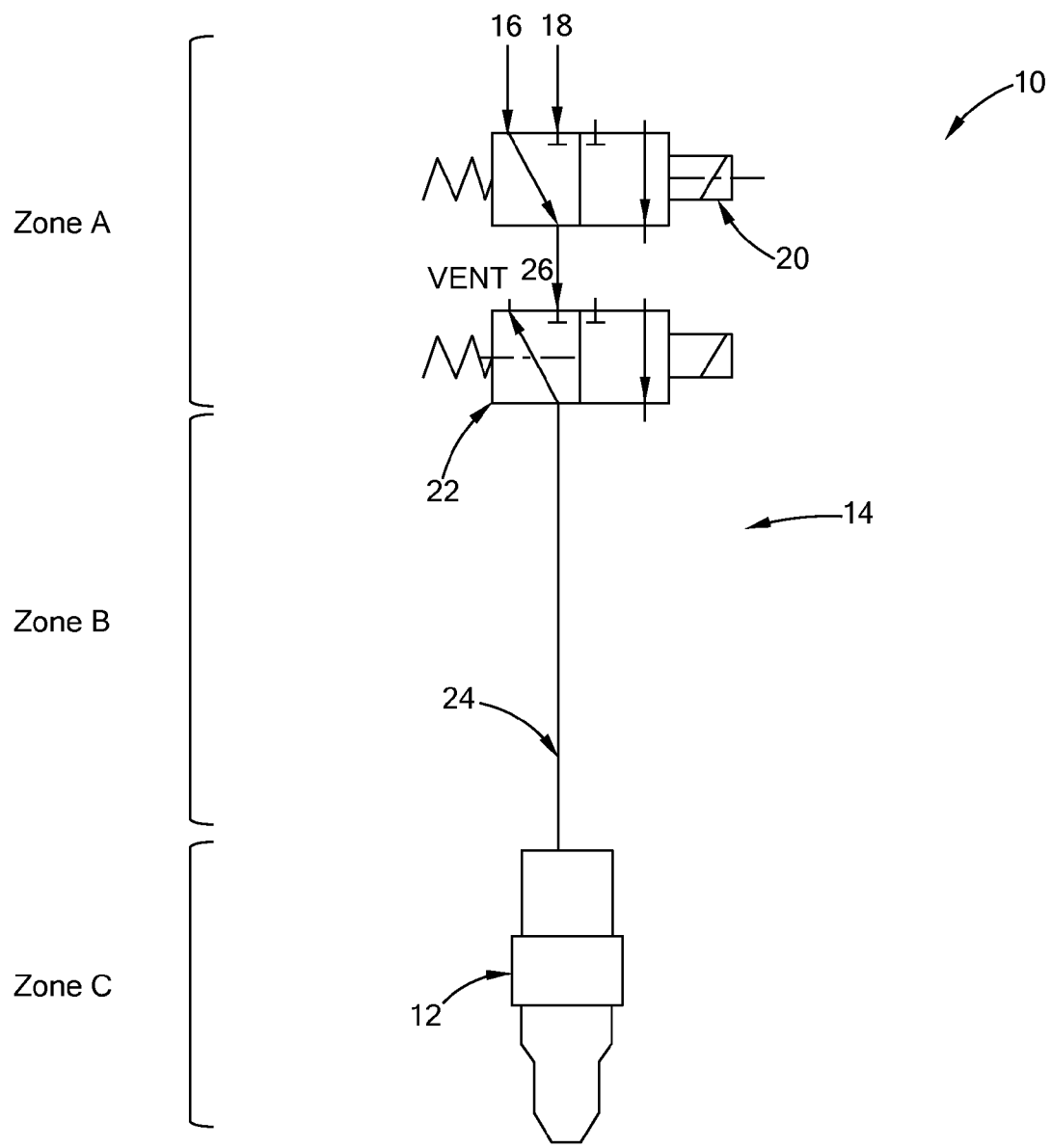
FIG. 1 is a schematic view of a prior art valve circuit for a prior art plasma arc torch.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Referring to FIG. 1, a prior art plasma arc torch 10 includes a torch head 12 and a valve circuit 14 that connects a pilot/pre-flow gas supply 16 and a plasma/cut gas supply 18 to the torch head 12. The valve circuit 14 includes a first solenoid 20, a second solenoid 22, and a main gas line 24. The pre-flow/pilot gas and the plasma/cut gas are controlled to flow through the torch head 12 by both the first and the second solenoids 20 and 22.

When the first and second solenoids 20 and 22 are in the deactivated state as shown in FIG. 1, no gas is supplied to the main gas line 24. When the second solenoid 20 is activated, the pre-flow gas is delivered through the second solenoid 20 and the main gas line 24 to a plasma chamber (not shown) in the torch head 12 to initiate a pilot arc. When the pilot arc is detected, the second solenoid 22 remains activated and the first solenoid 20 is activated to allow the plasma/cut gas from the plasma/cut gas supply to flow through the first and second solenoids 20 and 22 to the main gas line 24 and then to the plasma chamber in the torch head 12.

When the cutting process is completed, the first and second solenoids 20 and 22 are deactivated to stop supply of gas to the main gas line 24. The gas remaining in the main gas line 24 and the plasma chamber in the torch head 12 are vented through a vent port 26 of the second solenoid 22 until the gas pressure in the main gas line 24 is equal to the atmospheric pressure.

As shown, the first and the second solenoids 20 and 22 are located in Zone A of a plasma arc torch 10. The main gas line 24 is located in Zone B of the plasma arc torch 10. The torch head 12 is located in Zone C of the plasma arc torch 10.

In the prior art plasma arc torch 10, the main gas line 24 is at least 4 feet long. In some applications, the main gas line 24 may be up to 10 feet long. The main gas line 24 having a great length has the advantage of disposing the bulky solenoids 20 and 22 away from the torch head 12 for ease of mounting and to protect the solenoids 20 and 22 from debris and electrical noise. However, the main gas line 24 having a great length causes significant amount of the pilot/pre-flow gas to remain in the main gas line 24 when the pilot arc is detected and the first solenoid 20 is switched to start delivery of the plasma/cut gas. Before the plasma/cut gas travels all the way to the torch head 12, the cutting process is performed using the pilot/pre-flow gas remaining in the main gas line 24. The pilot/pre-flow gas contributes to poor cut quality in the initial period of the cutting process.

Figure 2:
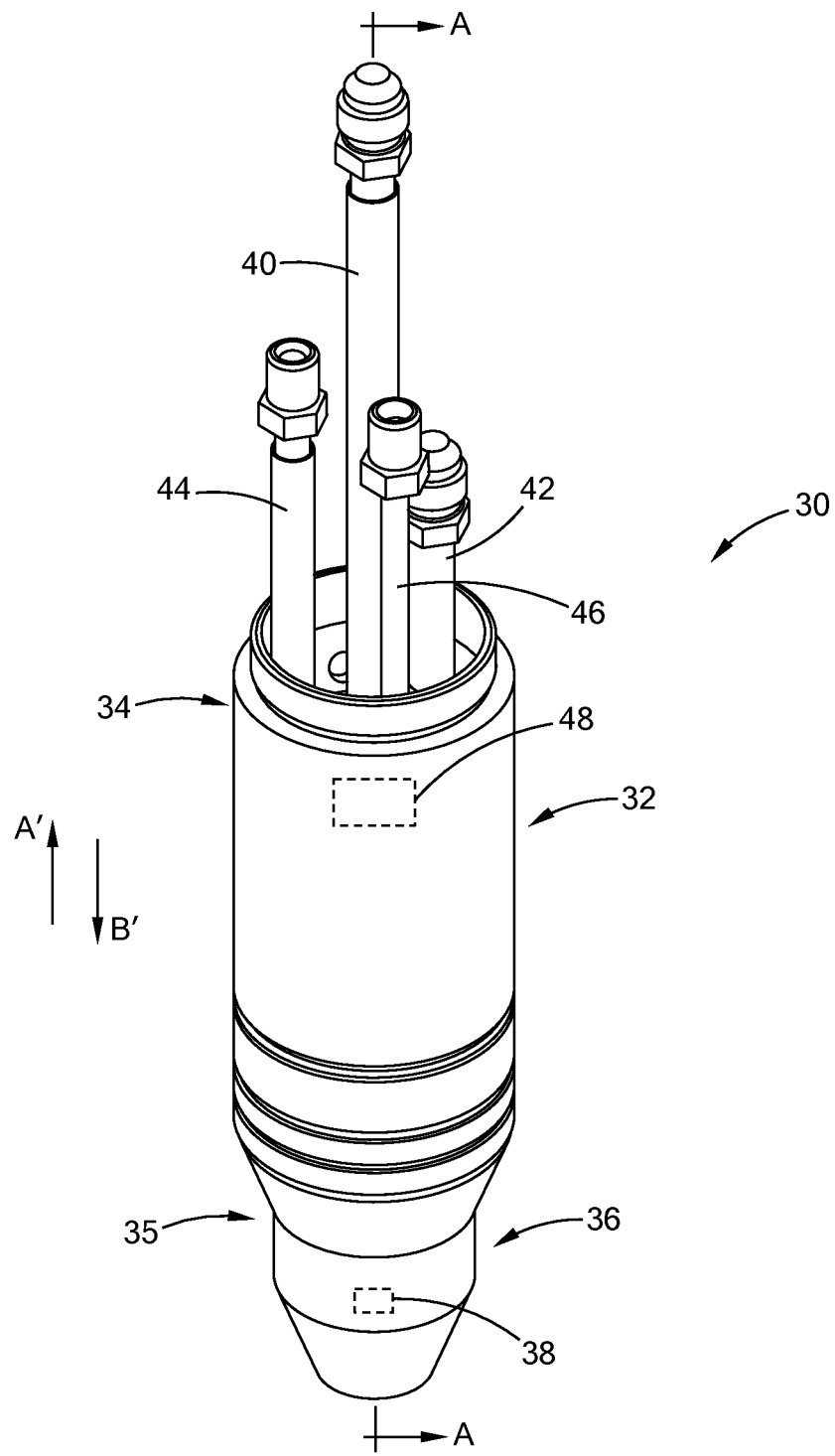
FIG. 2 is a perspective view of a plasma arc torch constructed in accordance with the principles of the present disclosure.
Figure 3:
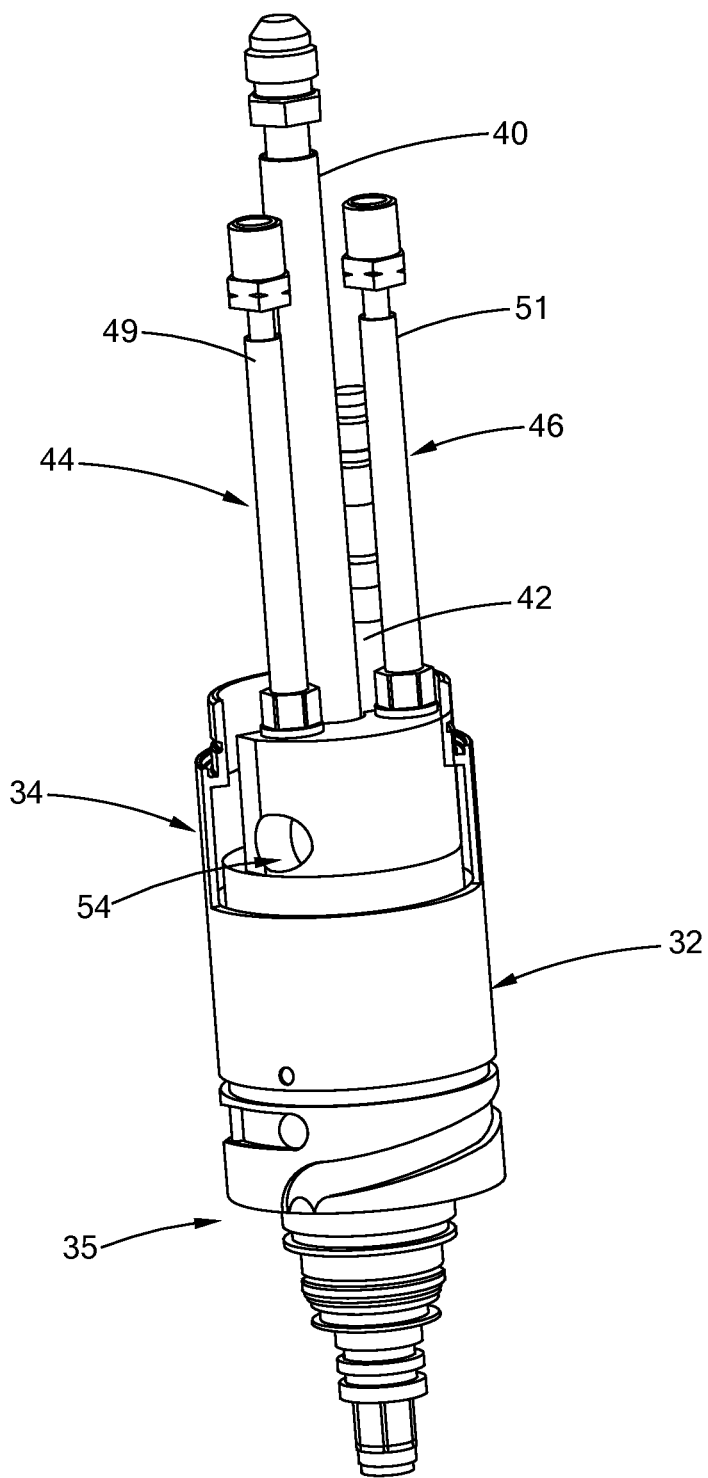
FIG. 3 is a perspective view of a plasma arc torch constructed in accordance with the principles of the present disclosure, where a consumable cartridge is removed for clarity.

Referring to FIGS. 2 and 3, a plasma arc torch according to the present disclosure is illustrated and indicated by reference numeral 30. The plasma arc torch 30 generally comprises a torch head 32 having a proximal end portion 34 and a distal end portion 35. The torch head 32, in this exemplary form, includes a consumable cartridge 36 removably mounted to the distal end portion 35 of the torch head 32. The consumable cartridge 36 houses several consumable components, including an electrode and a tip (not shown), between which a plasma chamber 38 is formed. The pre-flow gas is ionized in the plasma chamber 38 to initiate a pilot arc and a plasma gas is ionized to generate a plasma stream for the cutting process. (Operation of further details of such an exemplary torch is set forth in U.S. Pat. No. 7,019,254, which is commonly assigned with the present application and the contents of which are incorporated by reference herein in their entirety).

The plasma arc torch 30 further includes a coolant supply tube 40, a coolant return tube 42, a pre-flow gas conduit 44, and a plasma gas conduit 46, which are installed to the proximal end portion 34 of the torch head 32. The coolant supply tube 40 and the coolant return tube 42 provide cooling gas to and from the torch head 32. The pre-flow gas conduit 44 and the plasma gas conduit 46 are in fluid communication with the plasma chamber 38 for directing a pre-flow gas and a plasma gas, respectively, to the plasma chamber 38. A gas control device 48 is provided proximate the proximal end portion 34 of the torch head 32 for controlling the flow of the pre-flow gas and the plasma gas into the plasma chamber 38. The pre-flow gas generally includes air, whereas the plasma gas generally includes oxygen, although it should be understood that a variety of gas types may be employed while remaining within the scope of the present disclosure.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, proximal direction or proximally is the direction towards the torch head 32 from the consumable cartridge 36 as depicted by arrow A', and distal direction or distally is the direction towards the consumable components 36 from the torch head 32 as depicted by arrow B'.

Figure 4:
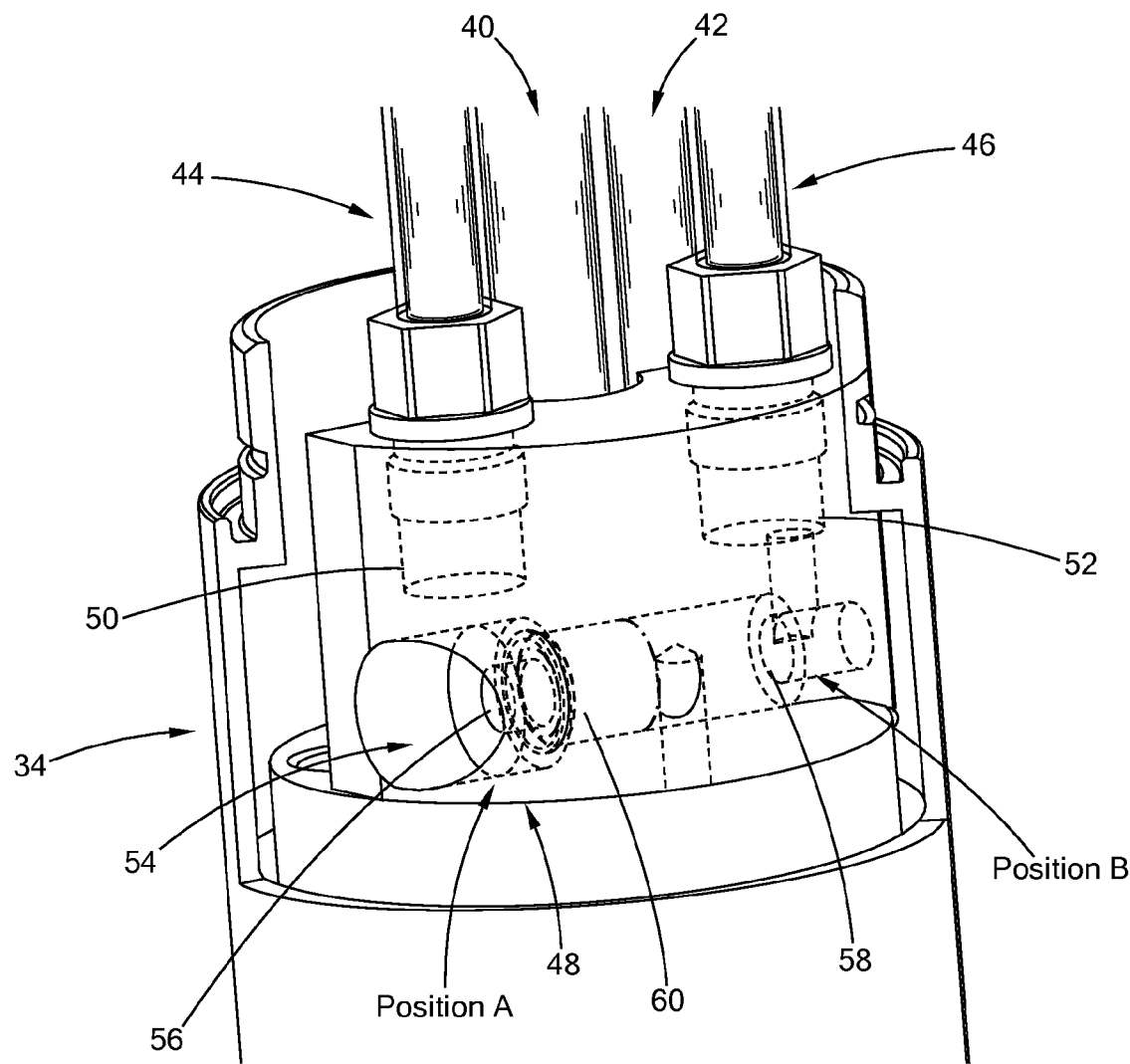
FIG. 4 is an enlarged partial perspective view of the torch head of FIG. 3, wherein a gas control device is shown to be in a first position A.
Figure 5:
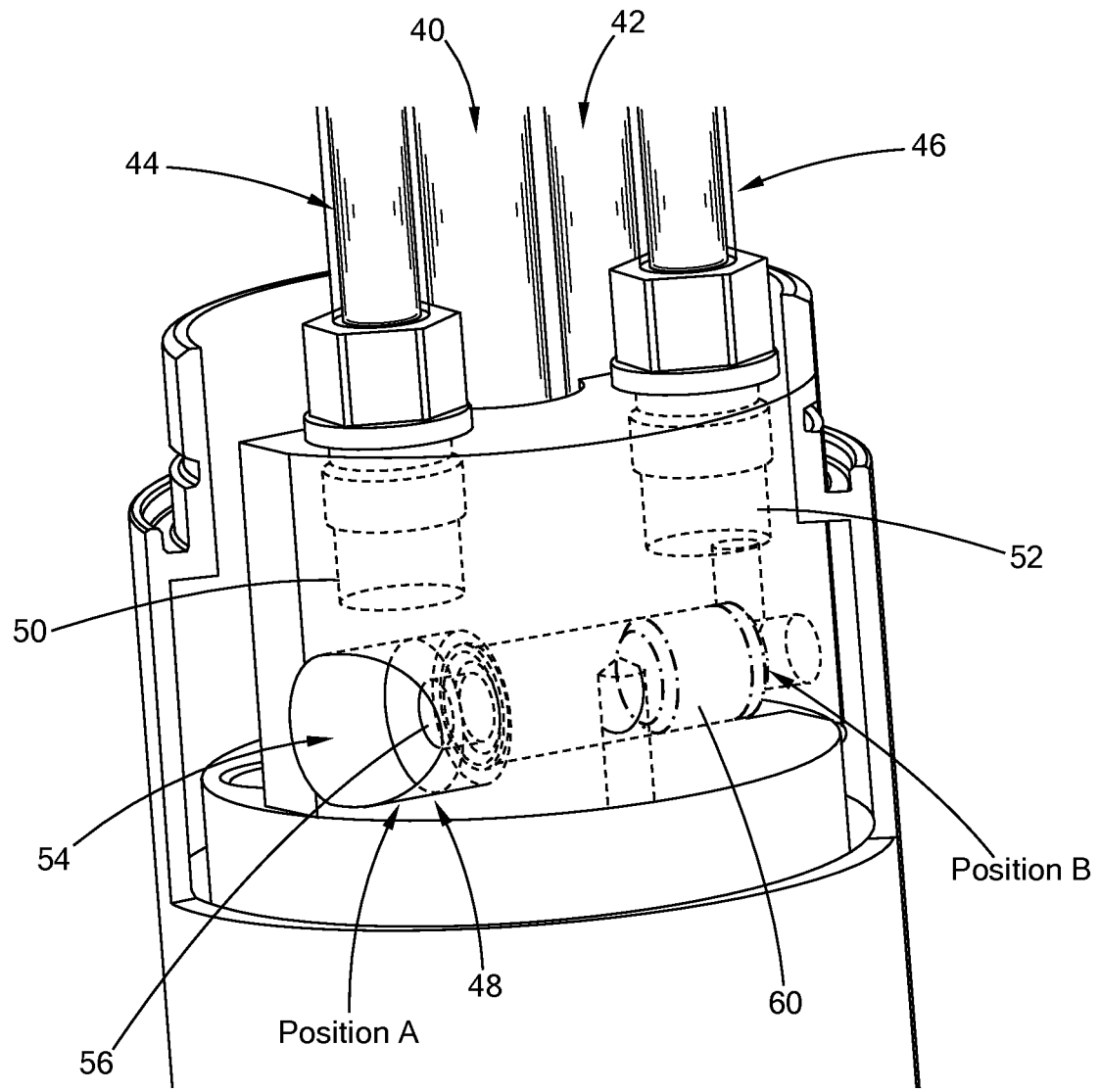
FIG. 5 is an enlarged partial perspective view of the torch head of FIG. 3, wherein a gas control device is shown to be in a second position B.

Referring to FIGS. 4 to 5, the pre-flow gas conduit 44 includes a a proximal end portion 49 (shown in FIG. 3) and a distal end portion 50 extending into the proximal end portion 34 of the torch head 32 and directs the pre-flow gas to the torch head 32. The plasma gas conduit 46 includes a proximal end portion 51 (shown in FIG. 3) and a distal end portion 52 extending into the proximal end portion 34 of the torch head 32 and directs the plasma gas through the torch head 32. The proximal end portion 34 of the torch head 32 defines a cavity 54 perpendicular to the distal end portions 50 and 52 of the pre-flow gas conduit 44 and the plasma gas conduit 46.

The gas control device 48, in the form of a shuttle valve in one form of the present disclosure, is disposed in the cavity 54 and includes a first inlet 56, a second inlet 58, and a sliding element 60 movable between the first inlet 56 and the second inlet 58. The pre-flow gas conduit 44 is in fluid communication with the cavity 54 through the first inlet 56. The plasma gas conduit 46 is in fluid communication with the cavity 54 through the second inlet 58.

The sliding element 60 in one form defines a brass piston and is movable between the first inlet 56 and the second inlet 58 by the pre-flow gas from the pre-flow gas conduit 44 or the plasma gas from the plasma gas conduit 46 depending on the gas pressure. The sliding element 60 may be moved to a first position A (FIG. 4) to block the first inlet 56 or to a second position B (FIG. 5) to block the second inlet 58.

In another form, the gas control device 48 may be a solenoid, and in another form, a pressure control valve such that the gases are switched based on pressure values. In one form, the pressure-based switching occurs from cut flow to pre-flow at the end of a cut such that the plasma arc torch may be stopped in air instead of oxygen.

Figure 6:
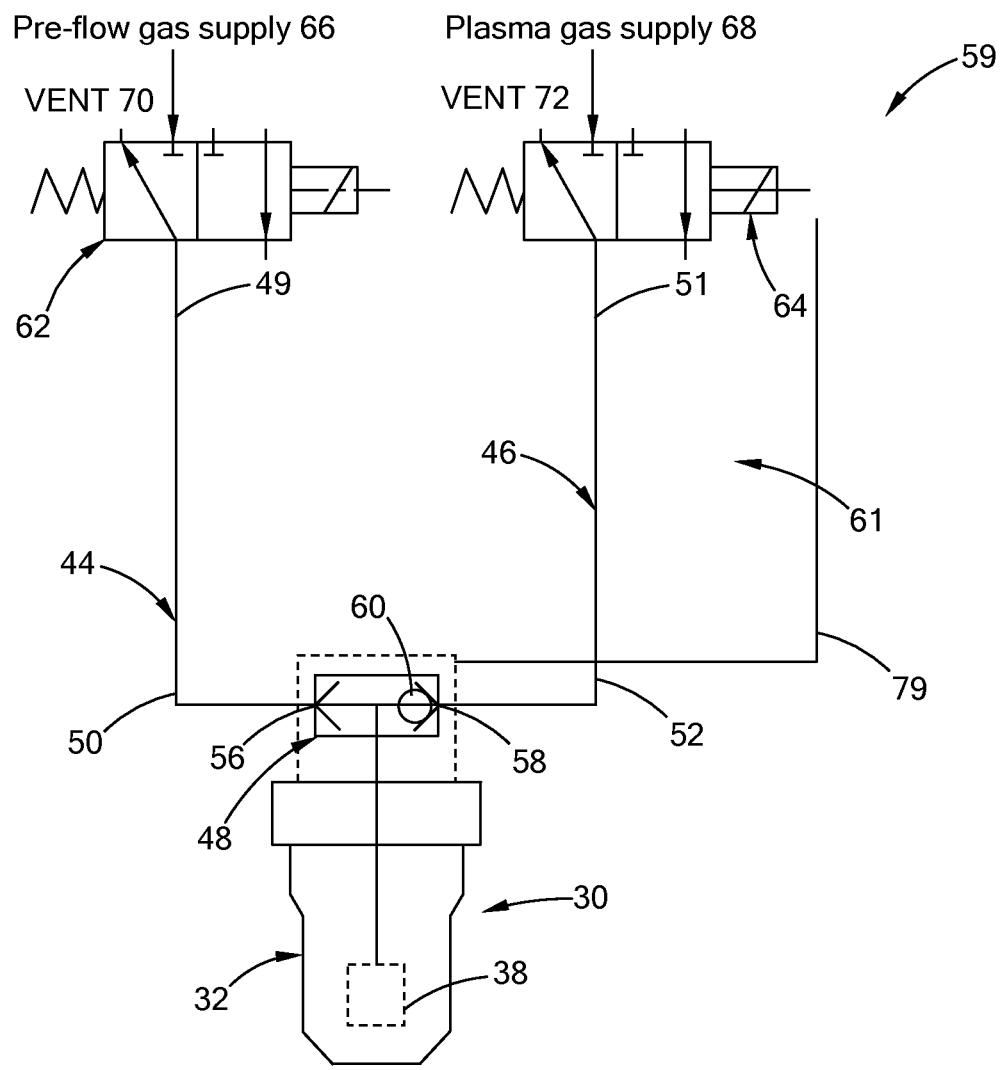
FIG. 6 is a schematic view of a plasma arc torch system including a plasma arc torch and a valve circuit constructed in accordance with the principles of the present disclosure.
Figure 7:
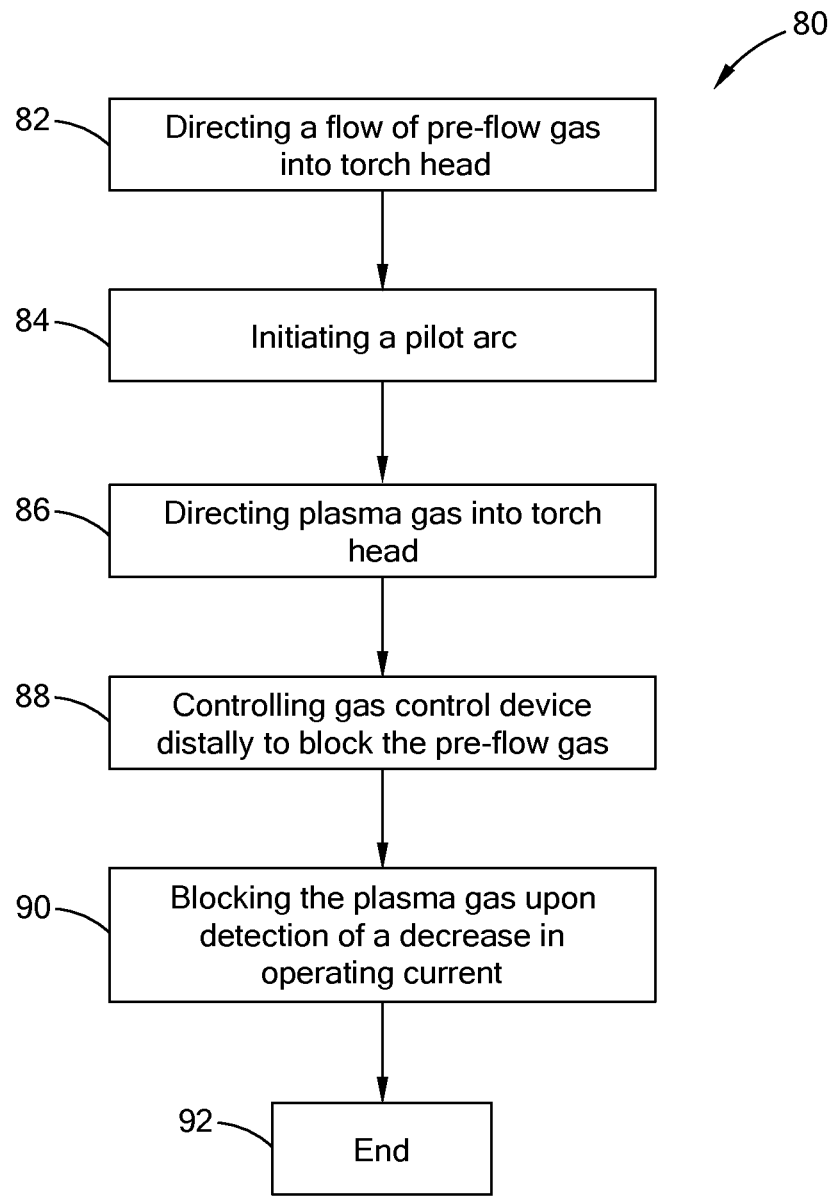
FIG. 7 is a flow diagram of a method of operating a plasma arc torch constructed in accordance with the principles of the present disclosure.

Referring to FIG. 6, a plasma arc torch system 59 includes the plasma arc torch 30 and a valve circuit 61 for directing the pre-flow gas and the plasma gas to the plasma arc torch 30, particularly the torch head 32. The valve circuit 61 includes a pre-flow solenoid 62 that connects the pre-flow gas conduit 44 to a pre-flow gas supply 66, and a plasma solenoid 64 that connects the plasma gas conduit 46 to a plasma gas supply 68. The pre-flow solenoid 62 is connected to the proximal end portion 49 of the pre-flow gas conduit 44. The plasma solenoid 64 is connected to the proximal end portion 51 of the plasma gas conduit 46. Each of the pre-flow gas and the plasma gas has a separate gas conduit 44 or 46 to the torch head 32. The pre-flow solenoid 62 and the gas control device 48 control the flow of the pre-flow gas into the torch head 32 and into the plasma chamber 38. The plasma solenoid 64 and the gas control device 48 control the plasma gas to the torch head 32 and into the plasma chamber 38.

The pre-flow solenoid 62 and the plasma solenoid 64 generally have the same structure and each includes a normally closed, three-way solenoid in one form of the present disclosure. When the pre-flow solenoid 62 and the plasma solenoid 64 are in an un-actuated position as shown in FIG. 6, the pre-flow gas from the pre-flow gas supply 66 and the plasma gas from the plasma gas supply 68 are blocked. No gas is supplied to the pre-flow gas conduit 44 and the plasma gas conduit 46. In this de-activated state, any gas remaining in the pre-flow gas conduit 44 and the plasma gas conduit 46 is vented through the vent port 70 of the pre-flow solenoid 62 and the vent port 72 of the plasma solenoid 64.

To operate the plasma arc torch 30, the pre-flow solenoid 62 is first actuated to allow the pre-flow gas to be delivered from the pre-flow gas supply 66 to the pre-flow gas conduit 44. The plasma solenoid 64 is unactuated. The gas control device 48 is not electrically operated. Instead, the gas control device 48 selectively allows one of the pre-flow gas and the plasma gas that has a higher pressure to enter and flow through the torch head 32. In this pre-flow stage, the pre-flow gas conduit 44 has a higher pressure than that of the plasma gas conduit 46, which is at atmospheric pressure. Therefore, the pre-flow gas in the pre-flow gas conduit 44 enters the gas control device 48 through the first inlet 56 to move the sliding element 60 towards the second inlet 58 to block and seal the second inlet 58. The pre-flow gas continues to flow through the gas control device 48 to the plasma chamber 38 to initiate a pilot arc.

When a pilot arc is detected, the plasma solenoid 64 is actuated to allow the plasma gas from the plasma gas supply 68 to flow through the plasma solenoid 64 to the plasma gas conduit 46. Concurrently, the pre-flow solenoid 62 is deactivated to stop the supply of the pre-flow gas. The pre-flow gas remaining in the pre-flow gas conduit 44 is vented to atmosphere.

When the plasma solenoid 64 is actuated to start delivery of the plasma gas, the pre-flow gas remains in the pre-flow gas conduit 36. Since the plasma gas is generally delivered at a pressure higher than the pressure of the pre-flow gas, the plasma gas can enter the gas control device 48 through the second inlet 58 to move the sliding element 60 towards the first inlet 56 to block and seal the first inlet 56. The pre-flow gas that remains in the pre-flow gas conduit 44 is prevented from entering the gas control device 48 and then to the plasma chamber 38 in the torch head 32. Although the plasma gas cannot reach the plasma chamber 32 as soon as the plasma solenoid 64 is switched on, only a small amount of pre-flow gas remains in the torch head 32 in the initial period of the cutting process. Therefore, the cut quality is not compromised when the pre-flow gas conduit 44 and the plasma gas conduit 46 are designed to have a long length to put the pre-flow solenoid 62 and the plasma solenoid 64 away from the torch head 32.

Alternatively, the pre-flow solenoid 62 can remain activated when the plasma solenoid 64 is activated during the cutting process. The plasma gas is generally delivered at a pressure higher than that of the pre-flow gas. Therefore, the plasma gas can still push the sliding element 60 towards the first inlet 56 to block the flow of the pre-flow gas into the gas control device 48 even when the pre-flow gas supply 66 continues to supply the pre-flow gas to the pre-flow gas conduit 44. The sliding element 60 is moved to allow the flow of gas supplied at the higher pressure and block the flow of gas at a lower pressure.

In another form, a plurality of plasma gas conduits may be employed in order to provide different plasma gas compositions, or a mixture of plasma gas compositions depending on the cutting operation, or depending on the timing of the cutting operation, i.e., start-up, cut, shut-down. One additional plasma gas conduit 79 is shown, however, it should be understood that two or more plasma gas conduits may be provided while remaining within the scope of the present disclosure. For example, in one form, one plasma gas conduit 51 directs a plasma gas having an Argon composition and the other plasma gas conduit 79 directs a plasma gas having a Nitrogen and Hydrogen composition. It should be understood that any of a variety of gas compositions and mixtures thereof may be employed while remaining within the scope of the present disclosure.

Referring to FIG. 8, a method 80 of controlling a gas flow through a plasma arc torch 30 is now described. In operation, a flow of pre-flow gas is directed into the torch head 32 of the plasma arc torch 30 in step 82. The flow of pre-flow gas is proximally controlled because the pre-flow solenoid 62 is positioned proximally from the gas control device 48. The flow of plasma gas is blocked during a piloting operation.

A pilot arc is initiated in step 84. When a pilot arc is sensed, the plasma solenoid 64 is actuated to allow the plasma gas to be directed into the plasma gas conduit 46 in step 86. The flow of plasma gas is proximally controlled because the plasma solenoid 64 is positioned proximally from the gas control device 48. The flow of the pre-flow gas and the plasma gas into the gas control device 48 and the torch head 32 is further controlled by the gas control device 48, which distally blocks one of the pre-flow gas and plasma gas in step 88. The flow of the pre-flow gas and the plasma gas through the gas control device 48 is controlled by a pressure of each of the gases. During the cutting process, the pre-flow gas is blocked. Upon detection of a decrease in operating current, indicating the cutting is completed, the plasma solenoid 68 is deactivated to its original position to block the flow of the plasma gas in step 90. The pre-flow solenoid 66 may be deactivated at the same time or earlier when the plasma solenoid 68 is activated. The method ends in step 92.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A plasma arc torch comprising:
   a torch head having a proximal end portion and a distal end portion;
   a pre-flow gas conduit for directing a pre-flow gas through the plasma arc torch and extending into the proximal end portion of the torch head, the pre-flow gas conduit having a distal end portion;
   at least one plasma gas conduit for directing a plasma gas through the plasma arc torch and extending into the proximal end portion of the torch head, the plasma gas conduit having a distal end portion; and
   a gas control device disposed proximate the proximal end portion of the torch head and extending between the distal end portion of the pre-flow gas conduit and the distal end portion of the plasma gas conduit, the gas control device being operatively connected to each of the pre-flow gas conduit and the plasma gas conduit, and the gas control device disposed within a cavity arranged perpendicular to the pre-flow gas conduit and the at least one plasma gas conduit,
   wherein the gas control device slides perpendicularly within the cavity between the pre-flow gas conduit and the at least one plasma conduit to selectively allow one of the pilot gas and the plasma gas to flow through the plasma arc torch.

2. The plasma arc torch according to claim 1, wherein the gas control device allows the gas having a higher pressure than the other gas to flow through the plasma arc torch.

3. The plasma arc torch according to claim 1, wherein the gas control device is a shuttle valve.

4. The plasma arc torch according to claim 3, wherein the shuttle valve includes a sliding element movable by one of the pilot gas and the plasma gas.

5. The plasma arc torch according to claim 4, wherein the shuttle valve includes a first inlet in fluid communication with the pre-flow gas conduit and a second inlet in fluid communication with the plasma gas conduit, the sliding element operable to seal one of the first inlet and the second inlet when the sliding element is moved toward the one of the first inlet and the second inlet.

6. The plasma arc torch according to claim 4, wherein the sliding element includes a brass piston.

7. The plasma arc torch according to claim 1, further comprising a pre-flow solenoid that controls a flow of the pre-flow gas from a pre-flow gas source to the plasma gas conduit, and a plasma solenoid that controls a flow of the plasma gas from a plasma gas source to the plasma gas conduit, each of the solenoids being positioned proximally from the gas control device.

8. The plasma arc torch according to claim 7, wherein the pre-flow solenoid and the plasma solenoid are disposed outside the torch head.

9. The plasma arc torch according to claim 1, wherein the gas control device is a solenoid.

10. The plasma arc torch according to claim 1, wherein the gas control device is a pressure control valve.

11. The plasma arc torch according to claim 1 further comprising at least two plasma gas conduits, each plasma gas conduit directing a different plasma gas composition.

12. The plasma arc torch according to claim 11, wherein one plasma gas conduit directs a plasma gas having an Argon composition and the other plasma gas conduit directs a plasma gas having a Nitrogen and Hydrogen composition.

13. A plasma arc torch comprising:
    a torch head having a proximal end portion and a distal end portion;
    a pre-flow gas conduit for directing a pilot gas through the plasma arc torch and extending into the proximal end portion of the torch head, the pre-flow gas conduit having a proximal end portion and a distal end portion;
    at least one plasma gas conduit for directing a plasma gas through the plasma arc torch and extending into the proximal end portion of the torch head, the plasma gas conduit having a proximal end portion and distal end portion;
    a pre-flow solenoid that controls a flow of the pre-flow gas from a pre-flow gas source to the pre-flow gas conduit, the pre-flow solenoid being operatively connected to the proximal end portion of the pre-flow gas conduit;
    at least one plasma solenoid that controls a flow of the plasma gas from a plasma gas source to the plasma gas conduit, the plasma solenoid being operatively connected to the proximal end portion of the plasma gas conduit; and
    a gas control device disposed proximate the proximal end portion of the torch head and extending between the distal end portion of the pre-flow gas conduit and the distal end portion of the plasma gas conduit, the gas control device being operatively connected to each of the pre-flow gas conduit and the plasma gas conduit, and the gas control device disposed within a cavity arranged perpendicular to the pre-flow gas conduit and the at least one plasma gas conduit,
    wherein the gas control device slides perpendicularly within the cavity between the pre-flow gas conduit and the at least one plasma conduit to selectively allow one of the pilot gas and the plasma gas to flow through the plasma arc torch.

14. The plasma arc torch according to claim 13, wherein the gas control device allows the gas having a higher or lower pressure than the other gas to flow through the plasma arc torch.

15. The plasma arc torch according to claim 13, wherein the gas control device is a shuttle valve.

16. The plasma arc torch according to claim 13, wherein the pre-flow solenoid and the plasma solenoid are disposed outside the torch head.

17. A plasma arc torch comprising:
    a torch head;
    a supplemental gas control device disposed proximate the proximal end portion of the torch head and extending between at least two gas conduits, each gas conduit having its own gas control device disposed proximally from the supplemental gas control device, the supplemental gas control device being operatively connected to each of the gas conduits to selectively allow one gas from one gas conduit to flow through the plasma arc torch, wherein the supplemental gas control is an element within a cavity arranged perpendicular to the at least two gas conduits, and wherein the element slides perpendicularly within the cavity between the at least two gas conduits.

18. The plasma arc torch according to claim 17, wherein the gas control device allows the gas having a higher pressure to flow through the plasma arc torch.

19. The plasma arc torch according to claim 17, wherein the gas control device is a shuttle valve.

20. The plasma arc torch according to claim 17, wherein the gas control device is a solenoid.

21. The plasma arc torch according to claim 17, wherein the gas control device is a pressure control valve.

22. The plasma arc torch according to claim 17 further comprising at least two plasma gas conduits, each plasma gas conduit directing a different plasma gas composition.

23. The plasma arc torch according to claim 22, wherein one plasma gas conduit directs a plasma gas having an Argon composition and the other plasma gas conduit directs a plasma gas having a Nitrogen and Hydrogen composition.

24. A plasma arc torch comprising:
a torch head having a proximal end portion and a distal end portion;
a pre-flow gas conduit for directing a pre-flow gas through the plasma arc torch and extending into the proximal end portion of the torch head, the pre-flow gas conduit having a distal end portion;
a plasma gas conduit for directing a plasma gas through the plasma arc torch and extending into the proximal end portion of the torch head, the plasma gas conduit having a distal end portion; and
a control valve disposed proximate the proximal end portion of torch head and extending between the distal end portion of the pre-flow gas conduit and the distal end portion of the plasma gas conduit, the control valve being operatively connected to each of the pre-flow gas conduit and the plasma gas conduit, and the control valve disposed within a cavity arranged perpendicular to the pre-flow gas conduit and the plasma gas conduit, wherein the control valve slides perpendicularly within the cavity between the pre-flow gas conduit and the plasma conduit to selectively allow one of the pilot gas and the plasma gas to flow through the plasma arc torch based on pressures of the pilot gas and the plasma gas.

25. The plasma arc torch according to claim 24, wherein the control valve is a shuttle valve.

26. A method of controlling a gas flow through a plasma arc torch, the method comprising:
directing a flow of pre-flow gas into a torch head of the plasma arc torch, the flow of pre-flow gas being proximally controlled;
directing at least one flow of plasma gas into the torch head of the plasma arc torch, the flow of plasma gas being proximally controlled; and
further controlling the flow of pre-flow gas and plasma gas through the plasma arc torch by distally blocking one of the pre-flow gas and plasma gas using a gas control device disposed within a cavity arranged perpendicular to a pre-flow gas conduit supplying the pre-flow gas and a plasma gas conduit supplying the plasma gas, wherein the gas control device slides perpendicularly between the pre-flow gas conduit and the plasma conduit.

27. The method according to claim 26 further comprising blocking the flow of pre-flow gas upon detection of a pilot arc.

28. The method according to claim 26, wherein the flow of pre-flow gas and plasma gas is controlled by a pressure of each of the gases.

29. The method according to claim 26 further comprising blocking the flow of plasma gas during a piloting operation.

30. The method according to claim 26 further comprising blocking the flow of plasma gas upon detection of a decrease in operating current.

31. The method according to claim 26 further comprising directing at least two flows of plasma gas, each flow having a different plasma gas composition.

32. The method according to claim 26 further comprising venting the flow of plasma gas downstream of the blocking at the end of a cutting operation, prior to venting upstream of the blocking.

* * * * *